No. 728,220. PATENTED MAY 19, 1903.
E. FOURNIER.
DISINFECTING APPARATUS.
APPLICATION FILED JULY 18, 1900.
NO MODEL. 2 SHEETS—SHEET 2.
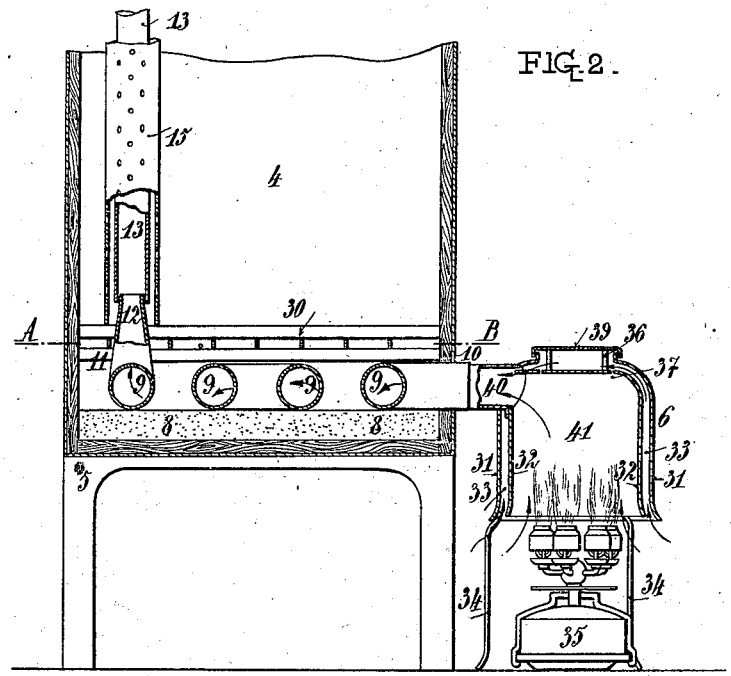
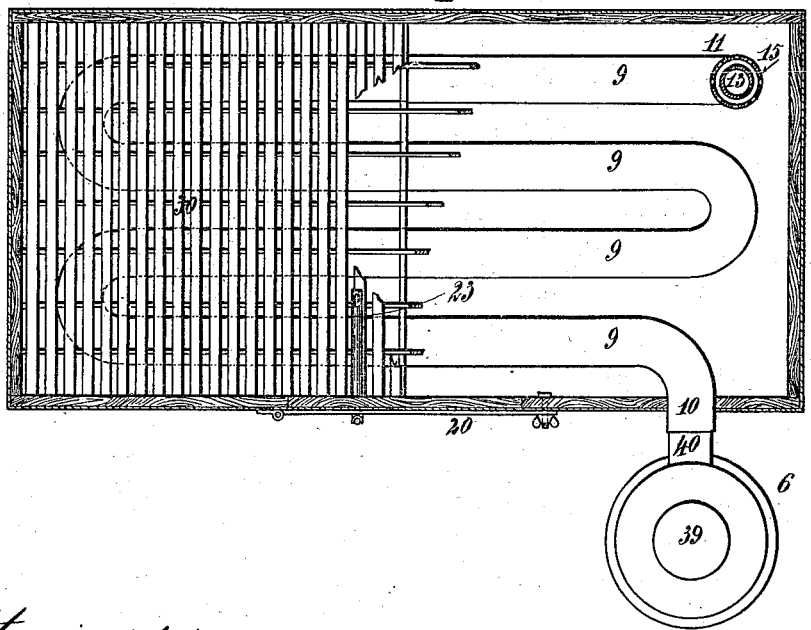

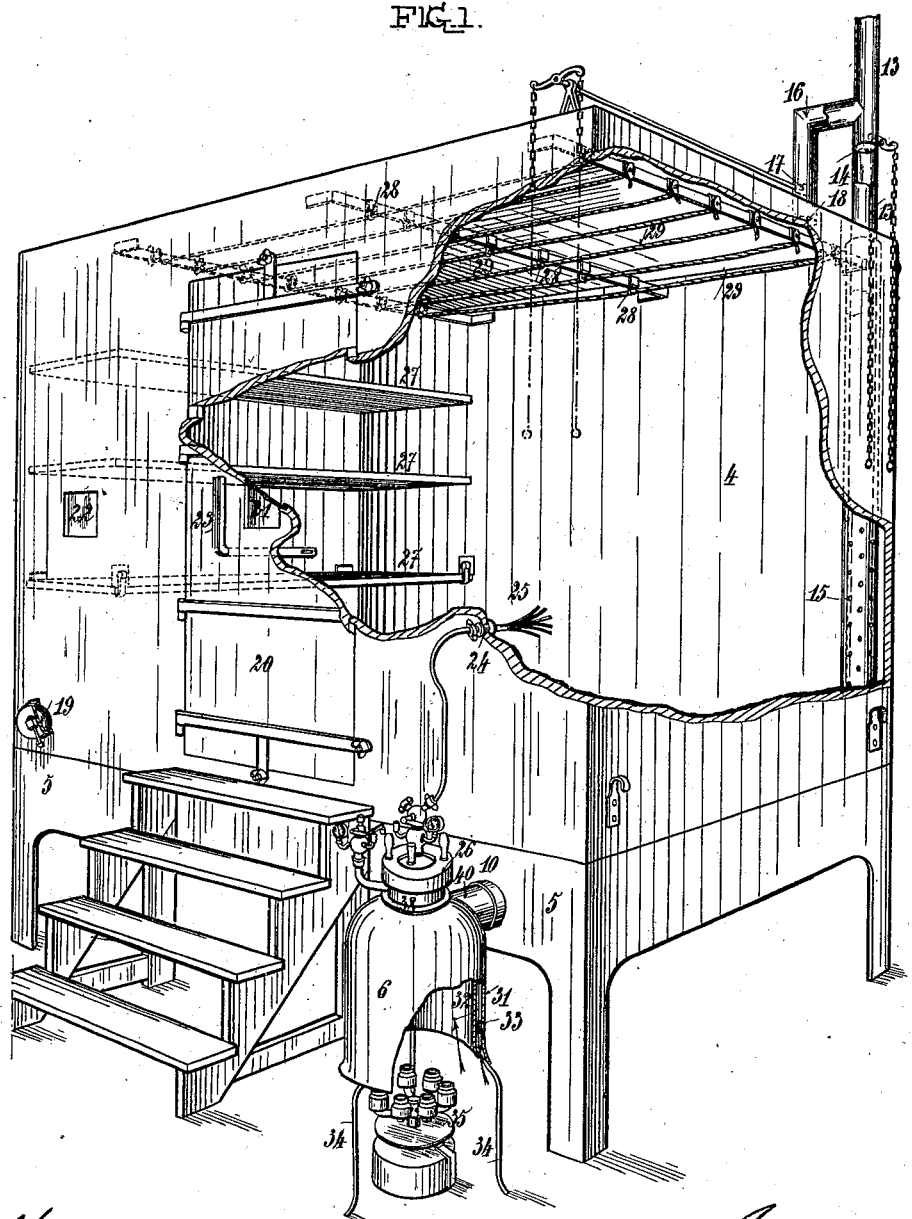

No. 728,220.

Patented May 19, 1903.

UNITED STATES PATENT OFFICE.

EUGÈNE FOURNIER, OF PARIS, FRANCE.

DISINFECTING APPARATUS.

SPECIFICATION forming part of Letters Patent No. 728,220, dated May 19, 1903.

Application filed July 18, 1900. Serial No. 24,077. (No model.)

*To all whom it may concern:*

Be it known that I, EUGÈNE FOURNIER, a citizen of the Republic of France, residing at Paris, France, have invented certain new and useful Improvements in or Relating to Disinfecting Chambers and Apparatus, of which the following is a full, clear, and exact description.

The present invention relates, essentially, to apparatus for use in disinfecting all kinds of bedding, clothes, felt, wearing-apparel, and fabrics generally by projecting any suitable disinfecting agent, such as a mixture of one part of acetone and two parts of water, into a closed chamber in which the articles are hung up or spread out. This apparatus may be constructed either as a stationary fixed plant or for transport, and consists of a chamber intended to receive the objects to be disinfected and means for preliminarily heating the chamber, for injecting the disinfectant, and for ventilating the apparatus.

The apparatus is represented in the accompanying drawings.

Figure 1 is a perspective of the whole arrangement, part of the walls being removed for the purpose of better displaying the interior arrangement. Fig. 2 is a side view showing the heating apparatus and arrangement, and Fig. 3 is a horizontal section on the line A B of Fig. 2.

The apparatus under consideration and represented in Fig. 1 comprises a chamber 4, the dimensions of which as regards length, height, and depth are fixed according to the kind and extent of operations for which the apparatus is intended and is supported at a sufficient height from the ground by a frame 5 with legs. In the case of stationary stoves the supporting-frame 5 may be omitted, the bottom of the apparatus resting directly on the ground, while the heating device is placed somewhat lower, so as to allow of a connection with the chamber under conditions which will be explained hereinafter. The interior of the apparatus is preferably lined with wood, and the outer part may consist of sheet metal, brickwork, or other convenient material, according as to whether the apparatus is to remain stationary or to be transportable. Close to the bottom of the chamber is arranged a horizontal serpentine coil—say about two centimeters from the bottom—consisting of a tube 9, one end 10 of which is adapted to communicate with the heating apparatus 6, the tube passing through the wall of the chamber, so as to allow an easy connection between the heater and tube, while the other end 11 of the said tube 9 projects upward from the bottom of the chamber in the form of a conical elbow 12, on which is fitted a tube 13 of a smaller diameter than that of tube 9, which tube 13 extends up through the whole height of the chamber and through the top, over which it rises some distance, so as to provide space for a regulating plate or valve 14. This tube 13 is itself surrounded, as far as the portion is concerned which is inclosed in the chamber, by another tube 15, provided with a number of orifices to allow the heat radiating from the tube 13 to pass into the chamber, while at the same time preventing any contact between the said tube 13 and the objects contained in the chamber. The part of tube 13 projecting above the chamber has a branch 16 a little above the regulating-valve 14, also provided with a closing or regulating valve 17, the said tube 16 passing through an orifice 18 in the ceiling of the chamber and serving, in combination with another orifice 19 in the front wall near the bottom of the chamber, for the ventilation of the said chamber before opening it after the disinfecting operation has been terminated. This opening 19 is closed by a suitable plug or cover. The regulating-valves 14 and 17 are actuated by means of rods and chains. The front wall of the chamber is provided with an opening of sufficient size to allow a person to enter and arrange the articles to be disinfected, which opening can be hermetically closed by a door 20, secured by bolts and nuts. A glazed inspection-opening 21 on the door, and other similar openings 22 arranged at suitable places in the walls of the chamber, admit sufficient light to allow the interior to be watched and observed. Finally, a small passage 24 serves to admit the branch pipe 25 of the vaporizer 26, intended for the production and injection of the disinfecting-vapors. The interior of the chamber is suitably furnished to hold the various articles to be disinfected, for which purpose it may be provided with shelves 27, on which are deposited the articles to be disinfected, and with cross-bars and hooks 28 and 29, from which articles of bedding and the like may be suspended. A removable grating flooring 30 is arranged a little above the serpentine tube 9, the bends of which are successively arranged at each end at slightly-higher levels, so as to present a slight and even upward incline for the hot air passing through.

The heating apparatus 6, which is first used to effect a preliminary heating of the chamber and then for producing and injecting the disinfecting-vapors, consists of a kind of bell with double walls 31 and 32, forming a free space 33, serving for the passage of the air and intended thereby to utilize the radiating heat. The bell is supported on legs 34, so as to allow of the introduction below it of a heater or burner 35, the said heater or furnace being fed either with gas or petroleum or with any other suitable combustible fuel. The central upper parts of the sides 31 and 32 are provided with openings 36 and 37, respectively, which when the apparatus is used for heating the chamber, as represented in Fig. 2, are closed by a double cover 39, while when used for projecting vapors into the chamber, as represented in Fig. 1, the double cover is removed, so as to allow the openings 36 37 to communicate with the apparatus 26, which produces and injects the disinfecting-vapors, the upper part of which, by means of a flange 38, rests on the top of the bell 6, as represented in Fig. 1. The bell is provided at the upper part with a sleeve 40, which can be connected with the end 10 of the heating-tube 9 and by means of which the hot air is supplied to the coil, being supplied on the one hand directly from the interior 41 of the bell, this air being directly heated by the burner or furnace 35, and on the other hand from the space 33, the air being here heated by radiation, as clearly indicated by the arrows in Fig. 2.

The operation of disinfecting is as follows: The article to be disinfected having been suitably arranged or suspended in the chamber, all the openings of the latter are hermetically closed and the source of heat ignited and placed below the double bell 6, so as to stand below the center of the latter, the bell being provided with its double cover 39, as represented in Figs. 2 and 3. The regulating valve-disk 14 of the flue-pipe 13 is opened sufficiently to insure the draft necessary for the good working of the furnace or burners 35. Now the regulating-valve 17 in the ventilating-tube 16 is opened for several minutes in order that as much as possible of the air contained in the chamber may be driven out through the tube 16, after which the valve is closed altogether. The heating of the apparatus continues generally for about thirty-five to forty minutes until a thermometer at 23 indicates about 85° centigrade of heat in the interior of the chamber. The double cover 39 is then withdrawn, and in its place and over the orifice 36 the vaporizing apparatus 26 is placed, as illustrated in Fig. 1. The pipe through which the disinfecting-vapors are injected is connected with the nozzle 25, through which the vapors enter the chamber. The heat is then moderated, so as to reduce it to a suitable degree as compared with the heat during the preliminary heating, and is kept at a constant temperature sufficient to heat the apparatus 26 so as to effect vaporization at the required pressure of the liquids used for the purpose of disinfecting, which consist partly of a mixture of acetone and water and partly of a mixture of formaldehyde, acetone, and water. The acetonized water just mentioned is a mixture of acetone and water, the proportions preferably used being one part of acetone to two parts of water. When the injector apparatus 26 has acquired sufficient pressure, a first injection of the mixture of acetone and water is effected. Then after about half an hour the mixture of formaldehyde, acetone, and water is injected, after which the furnace 35 is put out, the heating apparatus 6 withdrawn, and the outer orifice of the sleeve 10 closed by a stopper. After about one hour the heating apparatus 6 is again used and an injection of ammonia is effected. After a few minutes the regulating-valve 17 is opened, while the heating is still continued for a few moments, so as to more thoroughly ventilate the interior of the chamber, which ventilation is completed by opening the lower ventilating-orifice 19. The furnace having been extinguished, all the openings are closed again, and all that remains now after having opened the door 20 is to remove the various articles, which will be found to be absolutely disinfected and dry, without any odor attached to them and without the slightest deterioration.

What I claim as my invention, and desire to secure by Letters Patent, is—

1. Apparatus for use in disinfecting comprising an outside source of heat, a double bell above the heater comprising walls, 31, 32, arranged as described, and forming an intermediate space, a disinfecting-chamber, a serpentine tube for heated air at the bottom of said chamber, a connection between said tube and the space inclosed by the wall 32, and also with the space between the two walls 31, 32, an upright extension of said tube and a valve therein and a perforated protector surrounding said extension, substantially as described.

2. Apparatus for use in disinfecting comprising an outside source of heat, a double bell above the heater comprising walls 31, 32, arranged as described, and forming an intermediate space, a disinfecting-chamber, a serpentine tube for heated air at the bottom of said chamber, a connection between the tube and the space inclosed by wall 32, and also with the space intermediate the said walls 31, 32, an upright extension of said tube, a valve in said extension above the chamber and a valve branch tube above the valve and communicating with the chamber, substantially as described.

3. In apparatus of the kind described, a combined heating and vaporizing device comprising a source of heat, and a double bell comprising walls 31, 32, arranged as described and forming an intermediate space and having openings 36, 37 at the top.

4. In apparatus of the kind described, a combined heating and vaporizing device comprising a source of heat, a double bell comprising walls, 31, 32, arranged as described, and forming an intermediate space and having openings 36, 37 at the top and a cover removably mounted upon the wall 31 at the top thereof, for the purpose specified.

In testimony whereof I have signed my name to this specification in the presence of two subscribing witnesses.

EUGÈNE FOURNIER.

Witnesses:
   LOUIS LALLIGER,
   EDWARD P. MACLEAN.